(12) United States Patent
Lin (10) Patent No.: US 11,110,500 B2
(45) Date of Patent: Sep. 7, 2021

(54) UNIFORM TEMPERATURE ROLLER SYSTEM HAVING UNIFORM HEAT EXCHANGE BY SUPERCRITICAL FLUID

(71) Applicant: Tzu-Chi Lin, Taipei (TW)

(72) Inventor: Tzu-Chi Lin, Taipei (TW)

(*) Notice: Subject to any disclaimer, the term of this patent is extended or adjusted under 35 U.S.C. 154(b) by 0 days.

(21) Appl. No.: 16/786,505

(22) Filed: Feb. 10, 2020

(65) Prior Publication Data

US 2020/0230672 A1 Jul. 23, 2020

Related U.S. Application Data

(63) Continuation-in-part of application No. 15/696,691, filed on Sep. 6, 2017, now abandoned.

(30) Foreign Application Priority Data

Nov. 28, 2016 (TW) ................................ 105139129

(51) Int. Cl.
| | |
|---|---|
| *B21B 45/02* | (2006.01) |
| *F28F 5/02* | (2006.01) |
| *F28F 13/06* | (2006.01) |
| *B29C 33/04* | (2006.01) |

(52) U.S. Cl.
CPC .......... *B21B 45/0209* (2013.01); *B29C 33/04* (2013.01); *F28F 5/02* (2013.01); *F28F 13/06* (2013.01)

(58) Field of Classification Search
CPC ........ B21B 45/0209; B29C 33/04; F28F 5/02; F28F 13/06
See application file for complete search history.

(56) References Cited

U.S. PATENT DOCUMENTS

| | | |
|---|---|---|
| 4,053,277 A | 10/1977 | Bos et al. |
| 4,452,587 A | 6/1984 | Laws et al. |
| 4,631,016 A * | 12/1986 | Hay, II ................. B29C 33/044 |
| | | 165/89 |
| 4,943,831 A | 7/1990 | Geraets et al. |
| 5,009,825 A | 4/1991 | Lurie |
| 5,404,936 A | 4/1995 | Niskanen et al. |
| 6,095,237 A | 8/2000 | Haag |
| 6,202,556 B1 | 3/2001 | Lagger |
| 6,289,984 B1 | 9/2001 | Lagger |
| 9,296,146 B1 | 3/2016 | Thielman |

(Continued)

*Primary Examiner* — Francisco W Tschen
*Assistant Examiner* — Guy F Mongelli
(74) *Attorney, Agent, or Firm* — Juan Carlos A. Marquez; Marquez IP Law Office, PLLC (57) ABSTRACT

A uniform temperature roller system for uniform temperature exchange by supercritical fluid is revealed. The system includes a roller body, a pair of rotary shafts, a plurality of heating/cooling modules and a supercritical fluid. The roller body includes a first chamber, a second chamber and a third chamber. The second chamber is a closed space and the two rotary shafts are formed on two lateral plates of a housing of the roller body correspondingly. The heating/cooling modules are mounted in the second chamber and the supercritical fluid is filled in the second chamber for transferring temperature between the heating/cooling modules and the roller shell. Thereby the uniform temperature roller system achieves heating or cooling quickly with uniform heat exchange so as to improve quality and yield rate of the product as well as extend service life of the roller.

9 Claims, 11 Drawing Sheets

(56) References Cited

U.S. PATENT DOCUMENTS

| | | |
|---|---|---|
| 2001/0001402 A1 | 5/2001 | Jin et al. |
| 2002/0011688 A1 | 1/2002 | Nodono et al. |
| 2002/0130430 A1* | 9/2002 | Castor ................. B29B 9/12 264/14 |
| 2004/0089654 A1 | 5/2004 | Kitano et al. |
| 2005/0115059 A1* | 6/2005 | Fuseya ............. B29C 45/14639 29/606 |
| 2005/0219352 A1 | 10/2005 | Yamagishi |
| 2005/0244527 A1* | 11/2005 | Koyanagi ............ B65D 81/052 425/5 |
| 2006/0003044 A1* | 1/2006 | DiNello ................ B29C 44/14 425/412 |
| 2007/0138162 A1 | 6/2007 | Tonomura et al. |
| 2008/0017061 A1 | 1/2008 | Muller et al. |
| 2010/0330336 A1 | 12/2010 | Guillot et al. |
| 2011/0014408 A1 | 1/2011 | Fujiwara et al. |
| 2011/0030927 A1* | 2/2011 | Okano ..................... F28F 5/02 165/104.33 |
| 2011/0277494 A1* | 11/2011 | Kikuno .................... F28F 3/02 62/324.1 |
| 2012/0073567 A1 | 3/2012 | Winston |
| 2012/0104648 A1* | 5/2012 | Yiflach .................. B29C 48/10 264/209.3 |
| 2013/0270730 A1 | 10/2013 | Kawachi et al. |
| 2014/0086610 A1 | 3/2014 | Williams et al. |
| 2015/0043943 A1 | 2/2015 | Osaka et al. |
| 2015/0119484 A1 | 4/2015 | Osaka et al. |
| 2015/0174799 A1 | 6/2015 | Sumi |
| 2015/0190545 A1 | 7/2015 | Oral et al. |
| 2015/0267039 A1* | 9/2015 | Osaka ..................... B29B 9/10 524/88 |
| 2016/0138222 A1 | 5/2016 | Trani et al. |
| 2016/0256902 A1* | 9/2016 | Lyon ........................ A61L 2/24 |
| 2016/0318218 A1 | 11/2016 | Nakamura |
| 2016/0338374 A1 | 11/2016 | Seo et al. |
| 2016/0339761 A1 | 11/2016 | Enomoto et al. |
| 2016/0343637 A1 | 11/2016 | Axelrod et al. |

* cited by examiner

FIG. 8C

UNIFORM TEMPERATURE ROLLER SYSTEM HAVING UNIFORM HEAT EXCHANGE BY SUPERCRITICAL FLUID

BACKGROUND OF THE INVENTION

1. Technical Field

The present invention relates to a uniform temperature roller system for uniform temperature exchange by supercritical fluid, especially to a uniform temperature roller system used for making film products and having uniform temperature exchange by supercritical fluid during manufacturing process.

2. Description of Related Art

Generally, devices for industrial production such as laminating machines, food preparation machines, chemical machines, 3C film manufacturing equipment, knitting machines, etc. often use hot rollers for squeezing, pressing or embossing as equipment for continuous production. Along with wide applications of flexible electronics during manufacturing processes of liquid crystal display (LCD), electronic paper, thin-film solar cell or RFID, roll-to-roll technology which creates electronic components or material on a roll of flexible plastic or metal foil by rolling begins to receive more attention.

Figure 1:
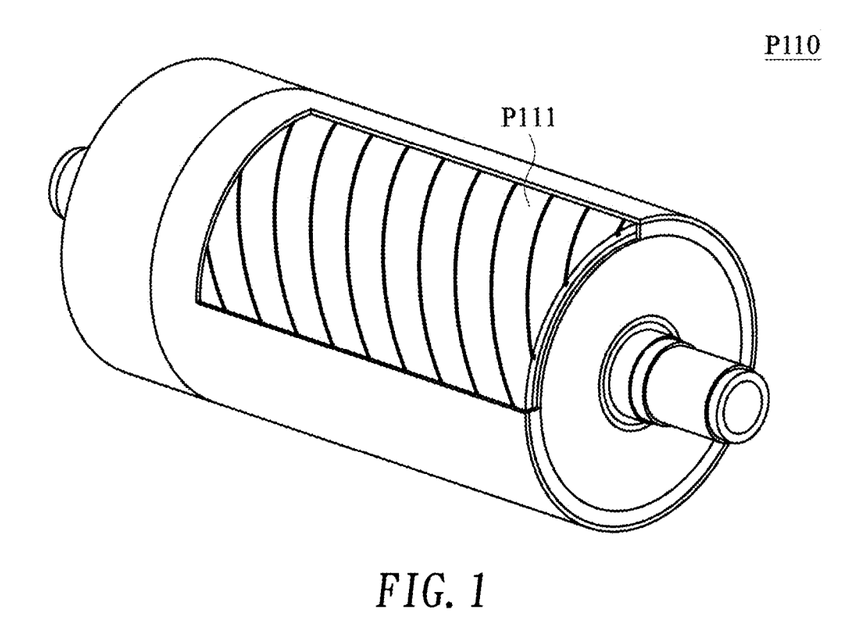
FIG. 1 is a schematic view showing a conventional hot spiral roller for squeezing, pressing, or embossing.
Figure 2:
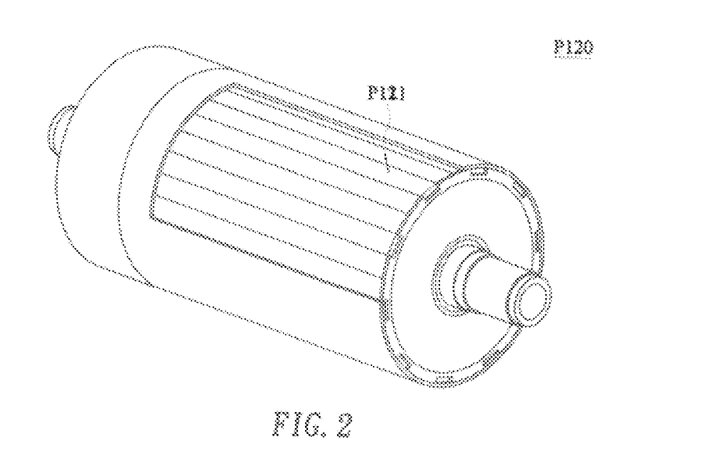
FIG. 2 is a schematic view showing a conventional hot drilled-in roller for squeezing, pressing, or embossing.

Refer to FIG. 1 and FIG. 2, the two most common hot rollers for squeezing, pressing or embossing are the spiral roller P110 and the drilled in roller P120. The spiral roller P110 uses spiral channels P111 to convey heat-conducting medium such as kerosene, water, etc. while the drilled in roller P120 conveys heat-conducting medium by parallel channels P121. Thereby heat conduction and heat exchange of the surface of the hot rollers are achieved.

Figure 3:
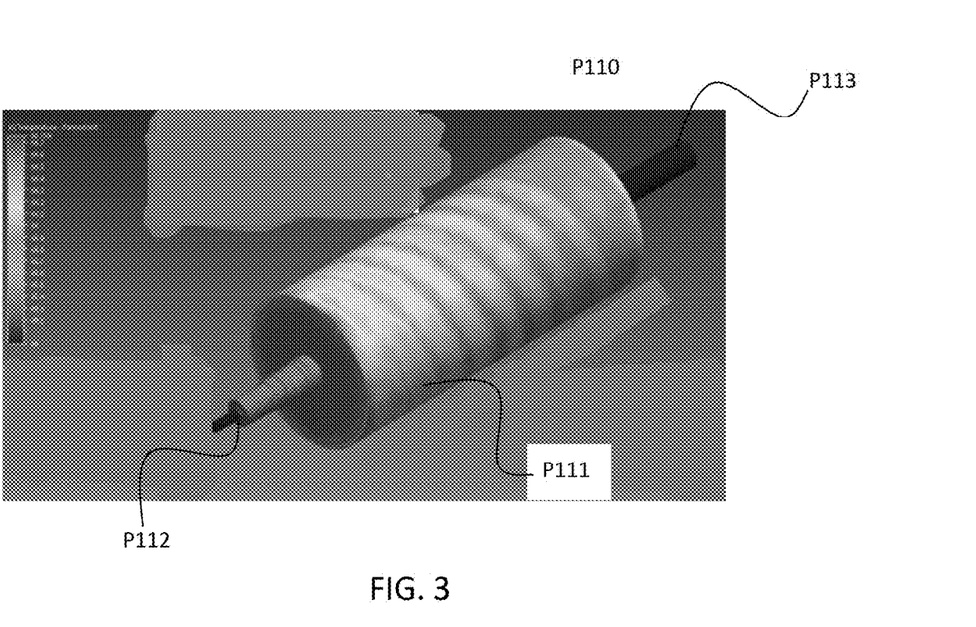
FIG. 3 is a schematic view showing temperature distribution of a conventional hot spiral roller for squeezing, pressing, or embossing.

As shown in FIG. 3, take the spiral roller P110 as an example. In the spiral roller P110 (or the drilled in roller P120), the heat-conducting medium is filled through an input end P112 of the hot roller and then output through an output end P113 on the other end of the hot roller. The temperature of the heat-conducting medium is gradually decreased along with the increased flowing path of the heat-conducting medium in the hot roller. The temperature difference between the input end P112 and the output end P113 is at least 1° C. or even higher. Thus the problem of temperature nonuniformity occurs and this has negative effects on the product quality and the yield rate, especially in high precision manufacturing processes such as nanoimprint lithography (NIL). The conventional hot roller is apparently unable to meet the process requirements.

Besides the temperature difference problem, the conventional rollers such as can only use liquid fluid such as water, kerosene, etc. as the heat-conducting medium due to the design of channels. The liquid heat-conducting medium not only easily causes rusting but also results in non-uniform temperature distribution. Thus there is room for improvement and there is a need to provide a uniform temperature roller which provides more efficient and synchronous thermal diffusion over the whole diffusion area to replace the roller with fluid medium. The uniform temperature roller can be applied to hot/cold squeezing, pressing or embossing processes.

SUMMARY OF THE INVENTION

Therefore it is a primary object of the present invention to provide a uniform temperature roller system for uniform temperature exchange by using supercritical fluid, which provides rapid and uniform heating/or cooling of the products to be processed during the heating or cooling process for improving the product quality, the yield rate of the products and the service life of rollers.

The present invention provides a uniform temperature roller system for uniform temperature exchange by using supercritical fluid comprising: a roller body which includes a roller shell having an internal hollow portion divided into a first chamber, a second chamber, and a third chamber by a pair of separation plates wherein the second chamber is an enclosed space; a pair of rotary shafts which are disposed on two side plates of the roller shell, respectively; a plurality of heating/cooling modules mounted in the second chamber and each of which having two ends connected to the pair of the separation plates correspondingly; and a supercritical fluid which is filled into the second chamber and out of the plurality of heating/cooling modules to use for transferring temperature between the heating/cooling modules and the roller shell.

Implementation of the present invention at least produces the following advantageous effects:

1. The uniform temperature roller system can be used for either heating or cooling by replacement of the temperature regulating medium filled therein.
2. The heat energy or energy required for cooling can be transferred and exchanged rapidly and uniformly by diffusion of the supercritical fluid with large contact area in the second chamber so as to achieve a uniform temperature of the roller shell.
3. Both quality and yield rate of the products are improved due to uniform heating/cooling provided by the present system.
4. Owing to improved temperature uniformity, different thermal expansion and contraction at different positions of the roller shell can be avoided. Thereby the roller has a longer service life.
5. The reduction of the service life of the roller caused by rust can be avoided.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 4:
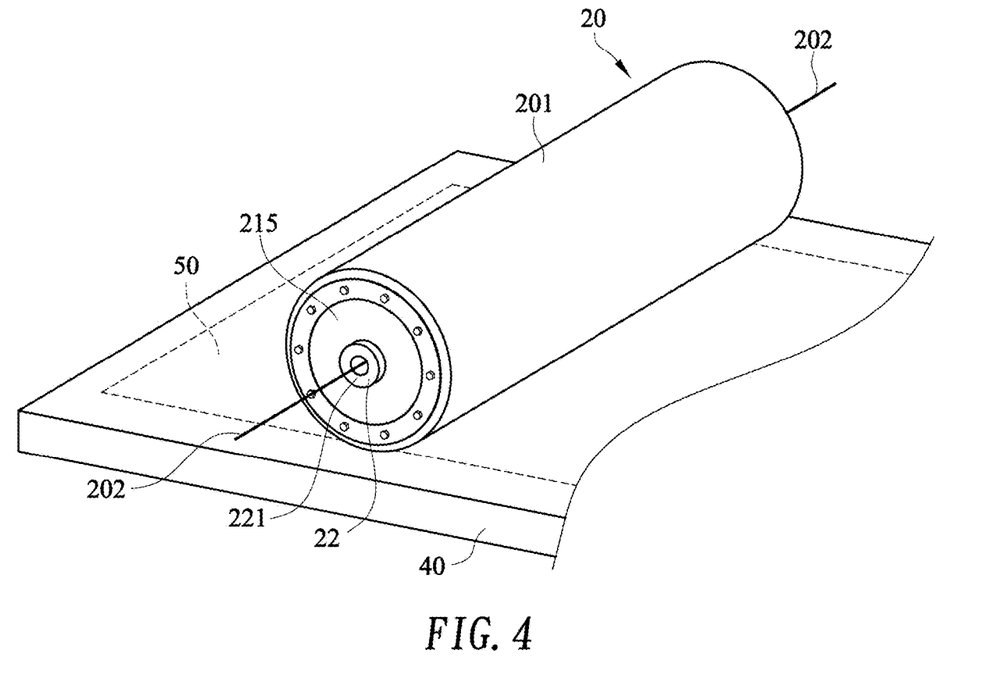
FIG. 4 is a schematic drawing showing an embodiment squeezing and pressing an object on a platform according to the present invention.

Refer to FIG. 4, an embodiment of a uniform temperature roller system 20 for uniform temperature exchange by supercritical fluid applied to film squeezing and pressing equipment is provided. The uniform temperature roller system 20 can generate uniform heating during the heating process or uniform cooling during the cooling process. Moreover, the uniform temperature roller system 20 can be used alone or in combination with the pressure roller.

The pressure roller is mainly used for generating contact pressure to effectively interact with an object (such as film) 50 to be processed, such as squeezing, pressing, embossing, cooling, heating, etc, during manufacturing and forming processes of the products.

The pressure roller can be a conventional common pressure roller which is a rubber roller or a metal roller. The present uniform temperature roller system 20 can also be used as the pressure roller.

The uniform temperature roller system 20 is used in combination with the pressure roller 10 to squeeze and press at least one object 50. Thereby the uniform temperature roller system 20 together with the pressure roller 10 holds the object 50 to be processed so that the object 50 can be manufactured effectively.

During manufacturing of certain products, the uniform temperature roller system 20 can also be used alone (without the pressure roller). For example, the uniform temperature roller system 20 is used to act on an object 50 on a platform 40.

Figure 5:
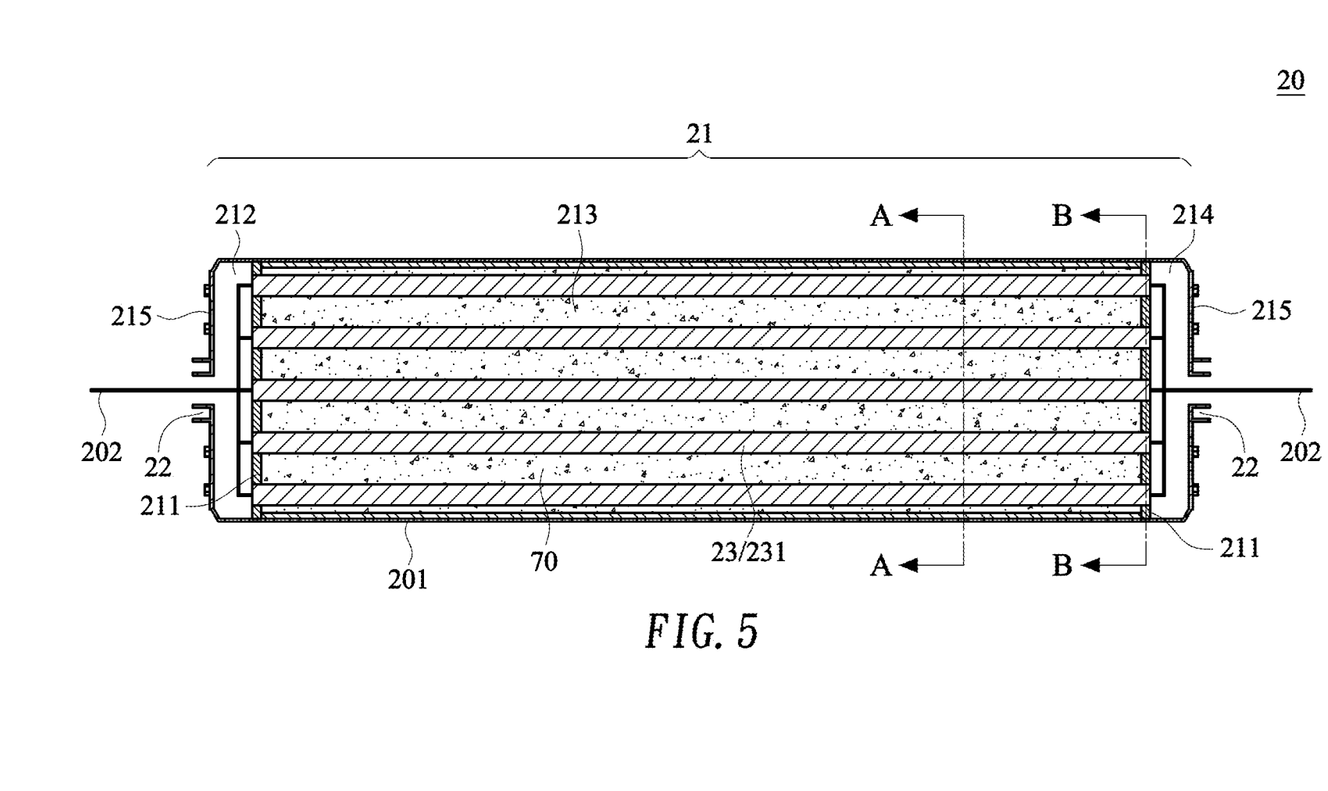
FIG. 5 is a sectional view of an embodiment of a uniform temperature roller system according to the present invention.

As shown in FIG. 5, a uniform temperature roller system 20 includes a roller body 21, a pair of rotary shafts 22, a plurality of heating/cooling modules 23 and a supercritical fluid 70.

The roller body 21 includes a cylindrical hollow roller shell 201. Generally, the roller body 21 is a metal roller. By a pair of separation plates 211, an internal hollow portion of the roller shell 201 is divided into a first chamber 212, a second chamber 213, and a third chamber 214, which are separated from one another. The second chamber 213 is a pressure-resistant closed space and mainly used for enabling the roller shell 201 of the roller body 21 to achieve a uniform temperature rapidly.

In order to make the roller body 21 rotate, the two rotary shafts 22 are formed on two side plates 215 of the roller body 21.

The heating/cooling modules 23 are mounted in the second chamber 213 and two ends of the respective heating/cooling modules 23 are connected to the pair of separation plates 211, respectively.

In order to make the roller shell 201 of the roller body 21 reach a uniform temperature quickly, the second chamber 213 is filled with at least one supercritical fluid (SCF) 70 and the supercritical fluid 70 is out of the plurality of heating/cooling modules 23. With low surface tension, low viscosity and gas-like high diffusivity, the supercritical fluid 70 is used for transferring temperature (such as heat/cool) between the heating/cooling modules 23 and the roller shell 201.

Figure 5A:
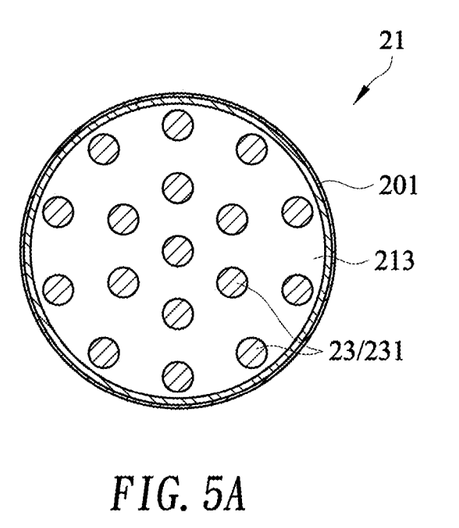
FIG. 5A is a sectional view taken along line A-A of the embodiment in FIG. 5 using electric-heating modules as heating/cooling modules according to the present invention.
Figure 5B:
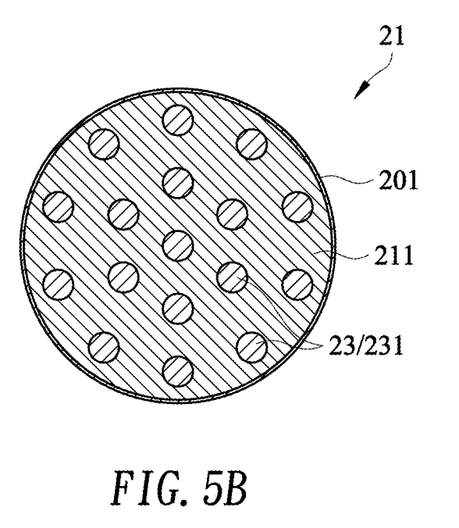
FIG. 5B is a sectional view taken along line B-B of the embodiment in FIG. 5 using electric-heating modules as heating/cooling modules according to the present invention.

As shown in FIG. 5A and FIG. 5B, each of the heating/cooling modules 23 of the uniform temperature roller system 20 is an electric-heating module 231 which uses electric-heating material to generate heat. When a wire 202 provides power to the electric-heating module 231 and heat energy up to 200° C. is generated, the heat energy generated is diffused to the roller shell 201 uniformly and quickly by heat convection of the supercritical fluid 70 which involves molecular diffusion of the supercritical fluid 70. Thereby the roller shell 201 is evenly heated up to about 195° C. for heating the products to be processed.

Figure 6:
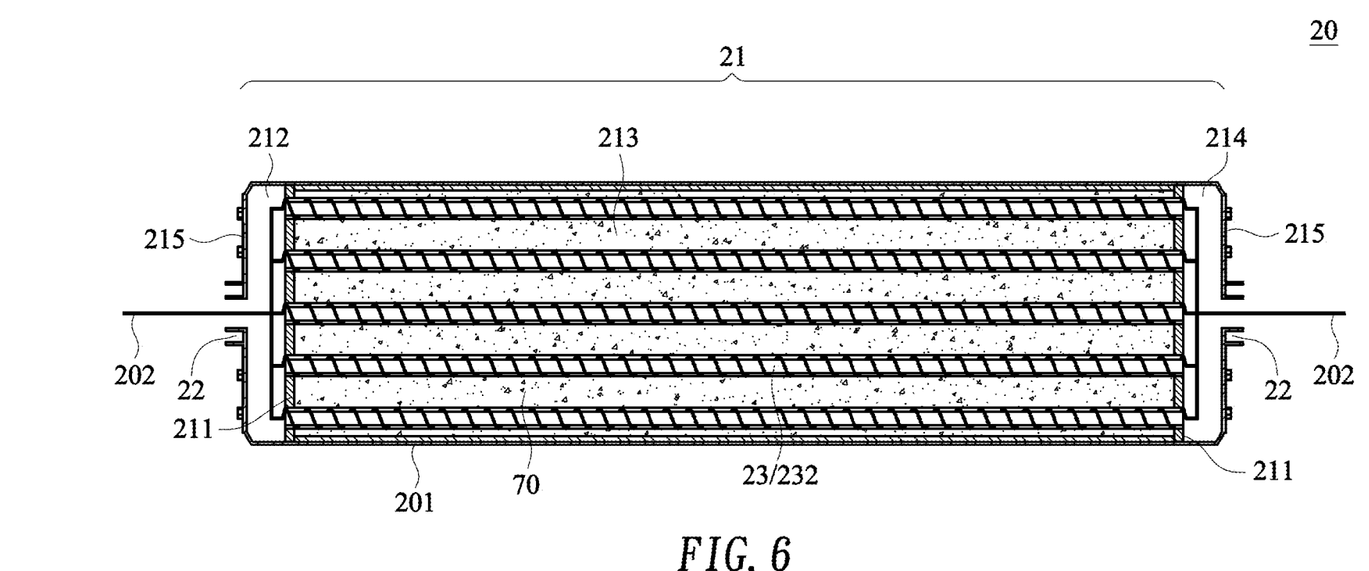
FIG. 6 is a sectional view of an embodiment of a uniform temperature roller system using induction heating modules according to the present invention.
Figure 6A:
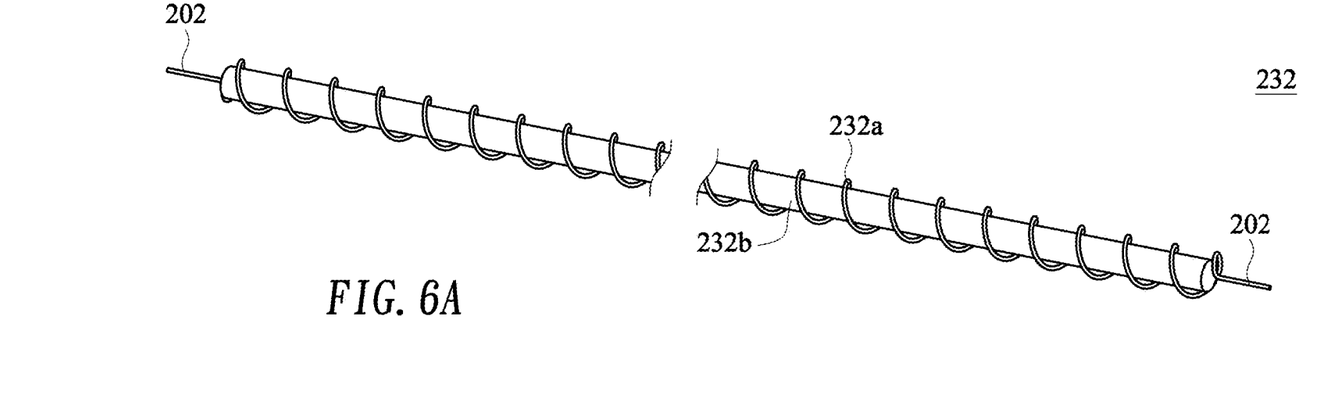
FIG. 6A is a perspective view of an induction heating module according to the present invention.

Refer to FIG. 6 and FIG. 6A, the electric heating module 231 mentioned above can also be an induction heating module 232 in which a magnetic field is generated and acted on a metal member 232b to generate heat energy when power is applied to a coil 232a.

Figure 7:
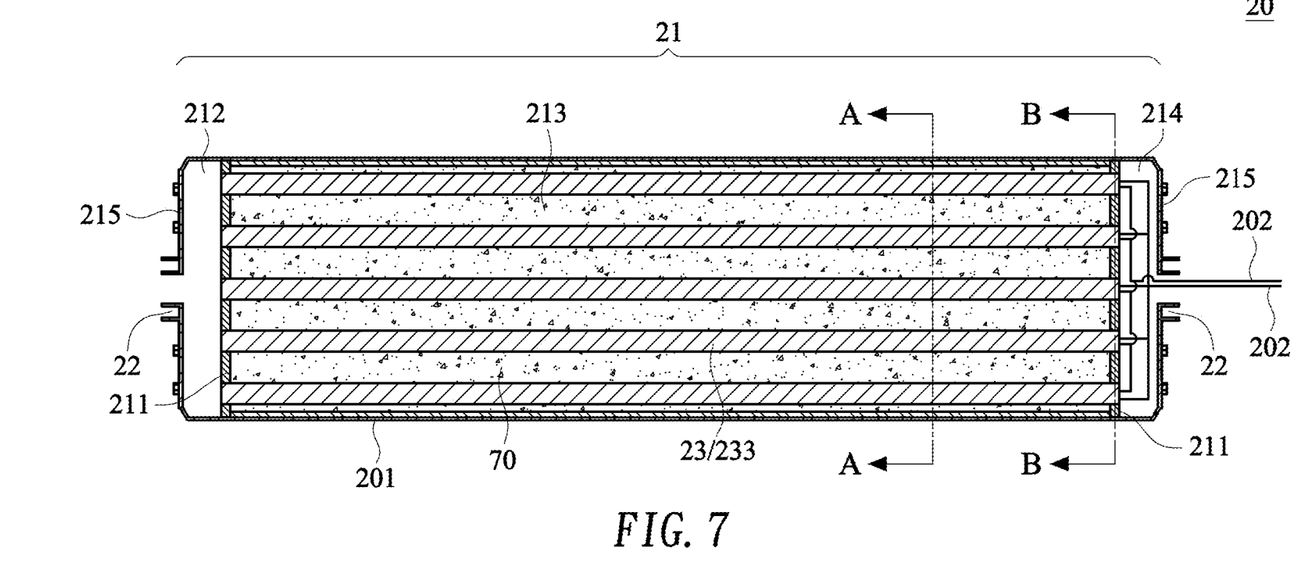
FIG. 7 is a sectional view of an embodiment of a uniform temperature roller system using thermoelectric cooling modules according to the present invention.
Figure 7A:
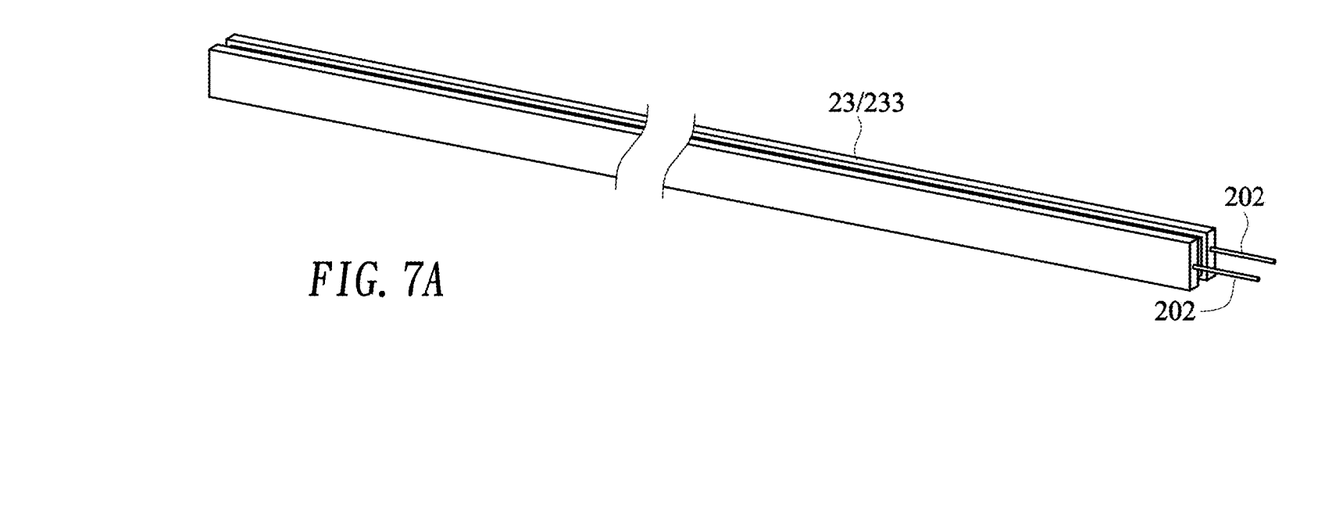
FIG. 7A is a perspective view of a thermoelectric cooling module according to the present invention.

Refer to FIG. 7 and FIG. 7A, each of the heating/cooling modules 23 of the uniform temperature roller system 20 is a thermoelectric cooling module 233 which is a chip capable of absorbing heat to achieve the purpose of cooling. For example, the temperature of the thermoelectric cooling module 233 is negative five degrees Celsius (−5° C.). When the roller shell 201 is used to cool down the processed products whose temperature is 120° C., the heat absorbed is evenly and quickly diffused to the thermoelectric cooling modules 233 by heat convection of the supercritical fluid 70 which involves molecular diffusion of the supercritical fluid 70. Thereby the purpose of cooling is achieved rapidly.

Figure 8:
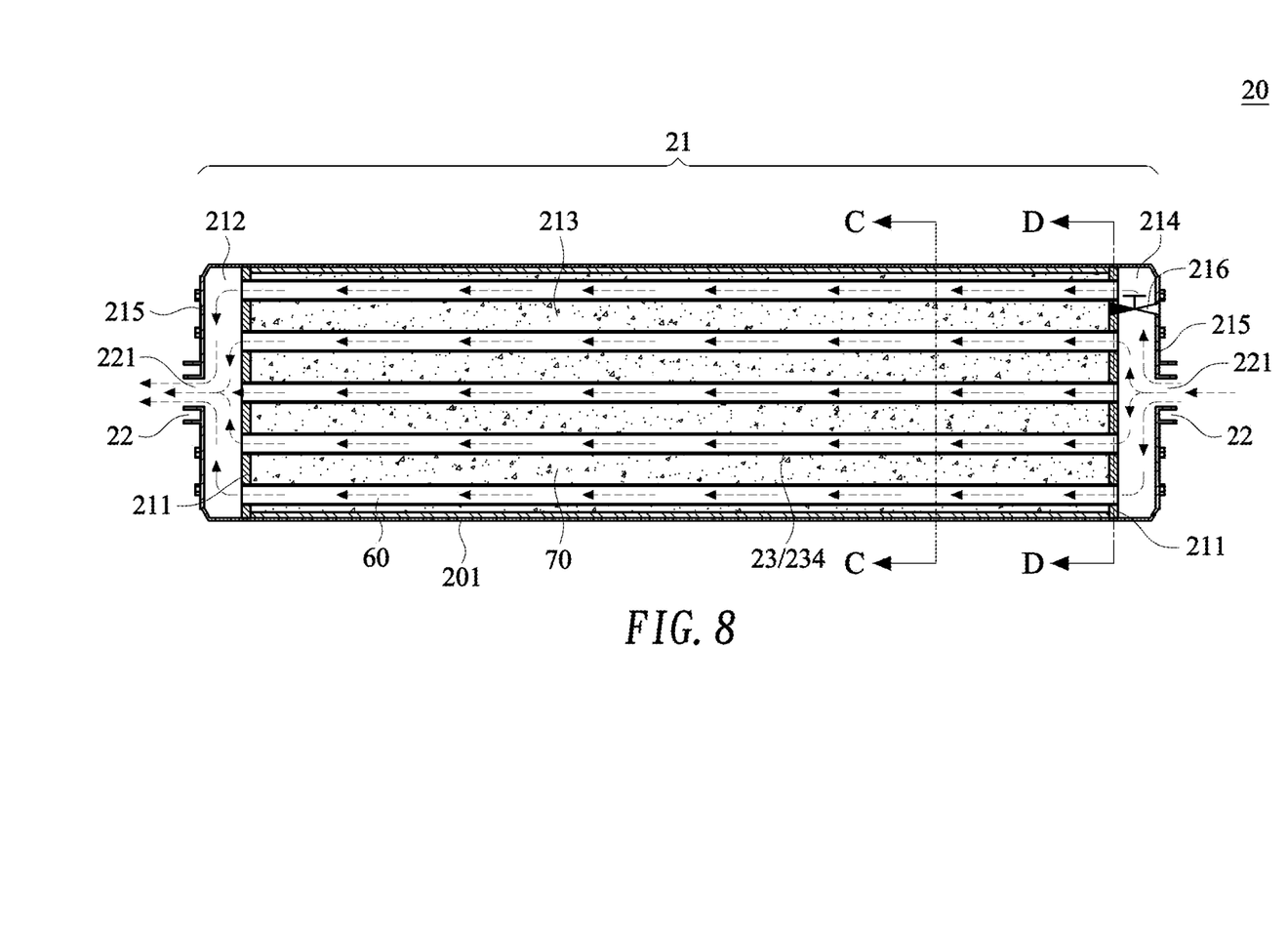
FIG. 8 is a sectional view of an embodiment of a uniform temperature roller system using temperature exchange modules according to the present invention.
Figure 8A:
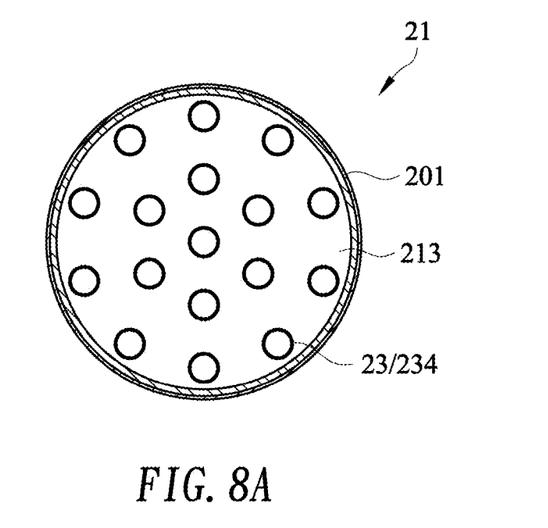
FIG. 8A is a sectional view taken along line C-C of the embodiment in FIG. 8 according to the present invention.
Figure 8B:
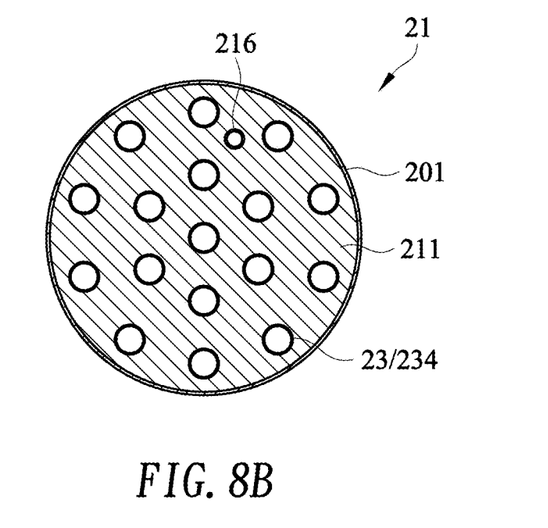
FIG. 8B is a sectional view taken along line D-D of the embodiment in FIG. 8 according to the present invention.
Figure 8C:
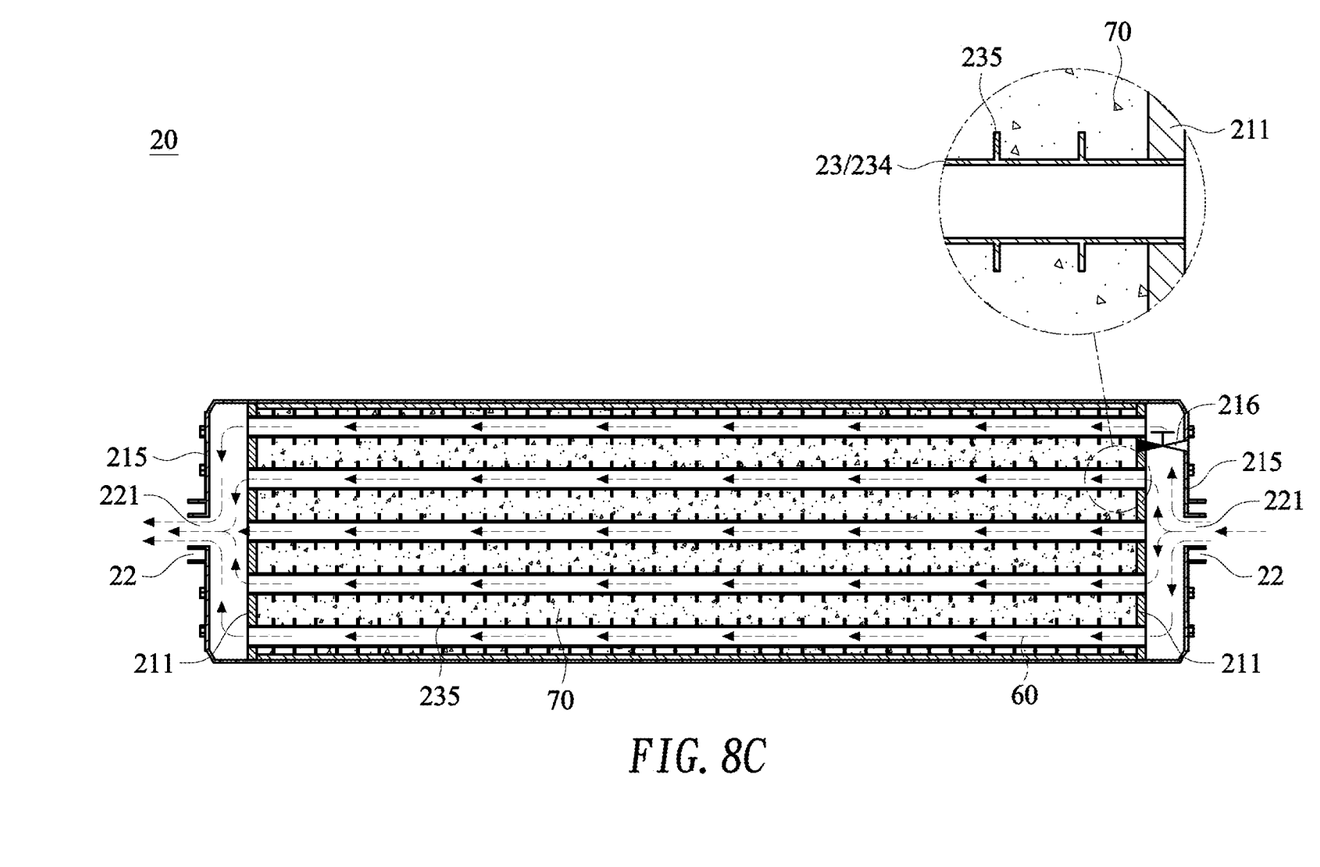
FIG. 8C is a sectional view of the embodiment in FIG. 8 with a plurality of heat exchange fins according to the present invention.

As shown in FIG. 8, FIG. 8A and FIG. 8C, the heating/cooling module 23 is designed to be a temperature exchange module 234 for heating/cooling besides the above electric heating module 231 and the thermoelectric cooling module 233. In order to improve heat exchange efficiency, at least one temperature exchange module 234 is further provided with a plurality of heat exchange fins 235 for increasing heat exchange area.

Moreover, two ends of each temperature exchange module 234 communicate with the first chamber 212 and the third chamber 214, respectively. A channel 221 is mounted in each of the rotary shafts 22 for input and output of a temperature regulating medium 60. The channels 221 communicate with the first chamber 212 and the third chamber 214, respectively.

The above temperature regulating medium 60 can be hot water, cold water, refrigerant, kerosene, etc. While in use, the temperature regulating medium 60 flows into the first chamber 212 through the channel 221 of one of the rotary shafts 22 for effective expansion in the space of the first chamber 212. Then the temperature regulating medium 60 passes through the temperature exchange modules 234 to be gathered in the third chamber 214 again. Lastly the temperature regulating medium 60 flows out through the channel 221 of the other rotary shaft 22. While the temperature regulating medium 60 flowing through the temperature exchange modules 234, heat exchange occurs between the temperature regulating medium 60 and the roller shell 201 by the supercritical fluid 70 in the second chamber 213 due to heat convection of the supercritical fluid 70 which involves molecular diffusion of the supercritical fluid 70.

More specifically, the temperature regulating medium 60 with high heat capacity is required when the uniform temperature roller system 20 with the temperature exchange modules 234 is used to heat the products to be processed. For example, 100° C. hot water or 150° C. kerosene flows into the first chamber 212 through one of the rotary shafts 22 and passes through the temperature exchange modules 234. Thereby the heat is diffused quickly into the roller shell 201 through the supercritical fluid 70. Hence the roller shell 201 is heated and used for heating the products to be processed.

While the uniform temperature roller system 20 with the temperature exchange modules 234 is used to cool the products to be processed, a low-temperature temperature regulating medium 60 such as 5° C. water or 5° C. kerosene is selected and used. The cold water or kerosene flows into the first chamber 212 through one of the rotary shafts 22 and passes through the temperature exchange module 234. Thereby the heat the roller shell 201 absorbed during the cooling of the 120° C. products to be processed is diffused quickly into the temperature exchange modules 234 through the supercritical fluid 70. Then heat exchange occurs again between the hot temperature exchange modules 234 and the cold temperature regulating medium 60. Thereby the cooling of the uniform temperature roller system 20 is achieved.

The supercritical fluid 70 can be carbon dioxide, water, methane, ethane, propane, ethylene, propene, methanol, ethanol, acetone or their combinations. The respective supercritical fluids 70 have different critical temperatures. According to the working temperature of the uniform temperature roller system 20 required, different types of supercritical fluid 70 are selected and used.

For effective replenishment, adjustment or replacement of the supercritical fluid 70, a check valve 216 is arranged at one of the side plates 215 of the roller body 21. The check valve 216 communicate with the second chamber 213 so that the supercritical fluid 70 in the second chamber 213 can be replenished, adjusted or replaced quickly by the check valve 216.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A uniform temperature roller system for making a roller shell reach a uniform temperature using supercritical fluid comprising:
    a roller body which includes:
    a roller shell having an internal hollow portion divided into a first chamber, a second chamber, and a third chamber by a pair of separation plates wherein the second chamber is an enclosed space;
    a pair of rotary shafts which are disposed on two side plates of the roller shell, respectively;
    a plurality of heating/cooling modules mounted in the second chamber and each of which having two ends connected to the pair of the separation plates correspondingly; and
    a supercritical fluid which is filled into the second chamber and out of the plurality of heating/cooling modules to use for transferring temperature between the heating/cooling modules and the roller shell.

2. The system as claimed in claim 1, wherein the roller shell is made of metal.

3. The system as claimed in claim 1, wherein at least one of the heating/cooling modules is an electric-heating module.

4. The system as claimed in claim 3, wherein at least one of the electric heating modules is an induction heating module.

5. The system as claimed in claim 1, wherein at least one of the heating/cooling modules is a thermoelectric cooling module.

6. The system as claimed in claim 1, wherein at least one of the heating/cooling modules is a temperature exchange module for heating/cooling having two ends communicate with the first chamber and the third chamber, respectively; a channel is mounted in each of the rotary shafts for input and output of a temperature regulating medium; the channels communicate with the first chamber and the third chamber, respectively so that the temperature regulating medium flows into the first chamber through one of the rotary shafts for expansion in the first chamber effectively; then the temperature regulating medium passes through the temperature exchange module for heating/cooling to be gathered in the third chamber and flows out through the other rotary shaft.

7. The system as claimed in claim 6, wherein at least one of the temperature exchange modules for heating/cooling is provided with a plurality of heat exchange fins.

8. The system as claimed in claim 1, wherein the supercritical fluid is selected from the group consisting of carbon dioxide, water, methane, ethane, propane, ethylene, propene, methanol, ethanol, acetone and a combination thereof.

9. The system as claimed in claim 1, wherein a check valve is arranged at one of the side plates of the roller shell and communicating with the second chamber.

* * * * *